United States Patent
Nerukonda et al.

(10) Patent No.: US 12,451,977 B2
(45) Date of Patent: Oct. 21, 2025

(54) TRANSCEIVER LOOPBACK TESTING

(71) Applicant: Xilinx, Inc., San Jose, CA (US)

(72) Inventors: Rambabu Nerukonda, San Jose, CA (US); Weiqi Ding, San Jose, CA (US); Amitava Majumdar, San Jose, CA (US); Bhuvanachandran K. Nair, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 54 days.

(21) Appl. No.: 18/393,151

(22) Filed: Dec. 21, 2023

(65) Prior Publication Data

US 2025/0211341 A1 Jun. 26, 2025

(51) Int. Cl.
*H04B 17/00* (2015.01)
*H04B 17/16* (2015.01)

(52) U.S. Cl.
CPC ......... *H04B 17/0085* (2013.01); *H04B 17/16* (2015.01)

(58) Field of Classification Search
CPC .............................. H04B 17/0085; H04B 17/16
See application file for complete search history.

(56) References Cited

U.S. PATENT DOCUMENTS

| | | | |
|---|---|---|---|
| 7,082,556 B2* | 7/2006 | Fishman | H04L 1/243 714/48 |
| 9,882,661 B1* | 1/2018 | Gross | H04B 17/21 |
| 11,009,546 B2* | 5/2021 | Hojabri | G01R 31/31905 |
| 2005/0193290 A1* | 9/2005 | Cho | H04B 17/0085 714/710 |
| 2016/0197684 A1* | 7/2016 | Tsai | H04B 17/29 455/67.14 |

* cited by examiner

*Primary Examiner* — Seung H Lee
(74) *Attorney, Agent, or Firm* — Slater Matsil, LLP

(57) ABSTRACT

A transceiver circuit is disclosed, the transceiver circuit including a first register circuit, configured to receive serial stimulus data and to generate multi-bit parallel stimulus data, a serializer circuit configured to receive the multi-bit parallel stimulus data and to generate serialized data based on the multi-bit parallel stimulus data, where the serializer circuit includes a serializer data storage device, and where the serializer data storage device lacks circuit structures for scanability, a deserializer circuit configured to receive serial receiver data corresponding with the serialized data and to generate multi-bit parallel response data based on the serial receiver data, where the deserializer circuit includes a deserializer data storage device, and where the deserializer data storage device lacks circuit structures for scanability, and a second register circuit, configured to receive the multi-bit parallel response data and to generate serial response data.

20 Claims, 9 Drawing Sheets

TRANSCEIVER LOOPBACK TESTING

TECHNICAL FIELD

The present invention relates generally to loopback testing of transceiver circuits, and, in particular implementations, to transceiver circuits that include scannable and unscannable registers.

BACKGROUND

Transceiver circuits may use loopback data paths to test transmitter circuitry and/or receiver circuitry. For example, test data may be generated and converted to transmission data by transmitter circuitry using circuitry for transmitting data. In addition, the transmission data may be converted by receiver circuitry to receiver response data. The receiver response data may be compared with digital data corresponding with the test data to provide an indication of whether the transceiver circuit is functioning properly.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
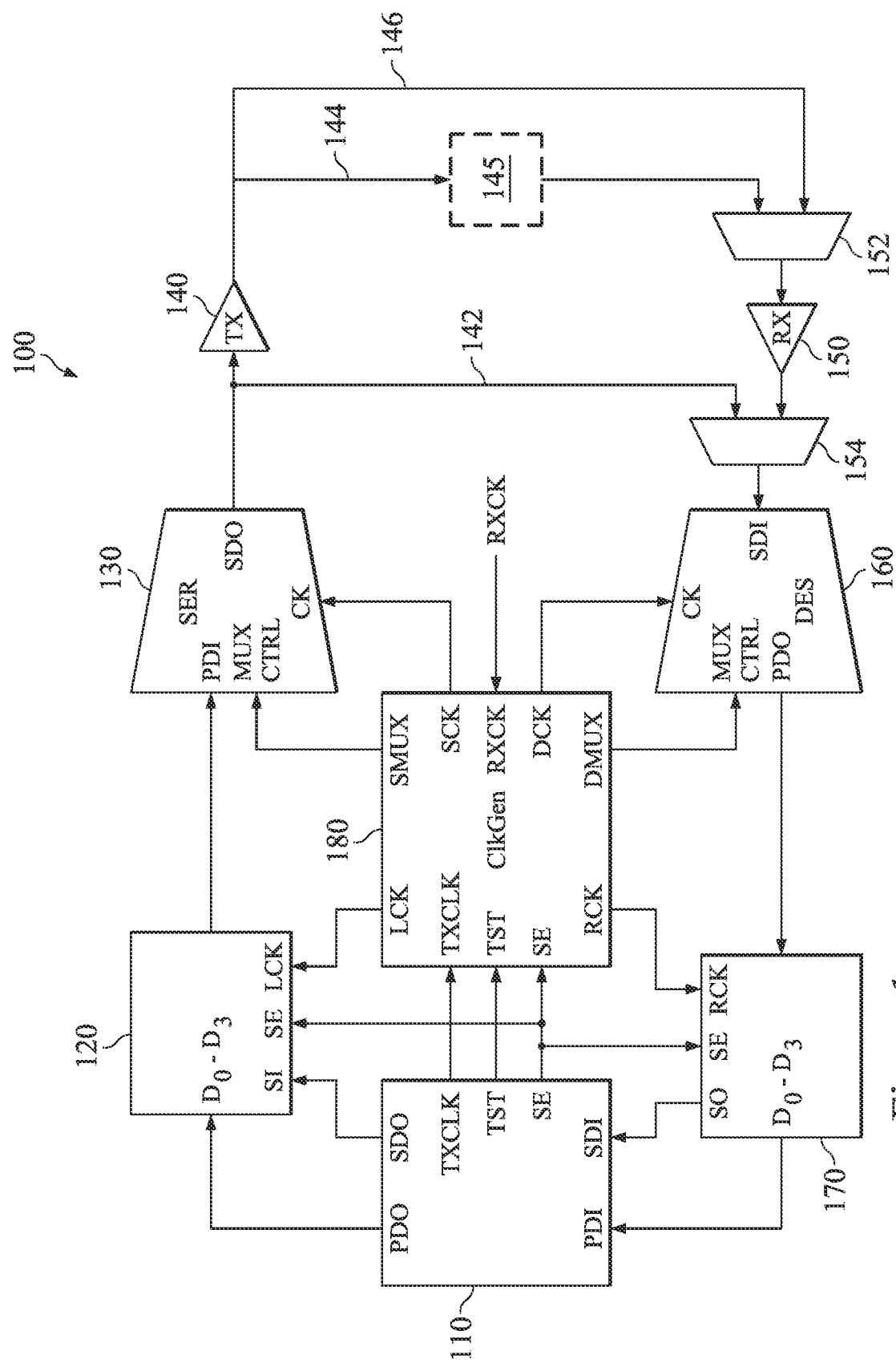
FIG. 1 illustrates a schematic block diagram of an example transceiver circuit including loopback data path options in accordance with implementations of the invention.

Corresponding numerals and symbols in the different figures generally refer to corresponding parts unless otherwise indicated. The figures are drawn to illustrate the relevant aspects of the implementations and are not necessarily drawn to scale. The edges of features drawn in the figures do not necessarily indicate the termination of the extent of the feature.

DETAILED DESCRIPTION OF ILLUSTRATIVE IMPLEMENTATIONS

The making and using of various implementations are discussed in detail below. It should be appreciated, however, that the various implementations described herein are applicable in a wide variety of specific contexts. The specific implementations discussed are merely illustrative of specific ways to make and use various implementations, and should not be construed in a limited scope. Unless specified otherwise, at least in some occurrences, the expressions "around", "approximately", and "substantially" may signify within 10%, and preferably within 5% of the given value or, such as in the case of substantially zero, less than 10% and preferably less than 5% of a comparable quantity.

Reference to "an implementation," "one implementation," "an implementation," or "one implementation" in the framework of the present description is intended to indicate that a particular configuration, structure, or characteristic described in relation to the implementation/implementation is included in at least one implementation/implementation. Hence, phrases such as "in one implementation" or "in one implementation" that may be present in one or more points of the present description do not necessarily refer to one and the same implementation/implementation. Moreover, particular conformations, structures, or characteristics may be combined in any adequate way in one or more implementations/implementations. The references used herein are provided merely for convenience and hence do not define the extent of protection or the scope of the implementations/implementations.

Testing digital circuitry using scannable flip-flop registers provides high fault coverage, low test time duration, high visibility for debugging for failure analysis, and allows for automatic test pattern generation, and test standard (e.g., gigabit transceivers (GT), universal chiplet interconnect express (UCIe), double date rate memory (DDR), high bandwidth memory (HBM)) conformance. Unfortunately, scannable flip-flop registers use more area, more power, and are slower than flip-flop registers which do not have the circuit structures making them scannable. Accordingly, scannable flip-flop registers may be judiciously used for some digital circuitry, and non-scannable flip-flop registers may be used elsewhere.

Aspects and techniques described herein use scannable flip-flop registers for those digital circuits which, during normal operation, operate at relatively low frequencies, and use non-scannable flip-flop registers for those digital circuits which, during normal operation, operate at relatively high frequencies. When testing, the circuits using scannable flip-flop registers may be loaded and read using scanning techniques at the relatively low frequencies, and the circuits using non-scannable flip-flop registers may be operated using the relatively high frequencies. As a result, the benefits of scannable flip-flop registers for testing may be realized while testing the circuits using non-scannable flip-flop registers at the relatively high frequencies used for their normal operation.

Implementations provided below describe various circuits and methods for testing functionality of a transceiver circuit, and in particular implementations, circuits and methods for effectively testing launch register circuits, serializer circuits, deserializer circuits, and receive register circuits of the transceiver circuit. In some implementations, the launch register circuits and the receive register circuits are implemented using scannable flip-flop registers, and the serializer circuits and deserializer circuits are implemented using non-scannable flip-flop registers. The inventive aspects described herein are not limited to the particular implementations discussed.

Figure 2:
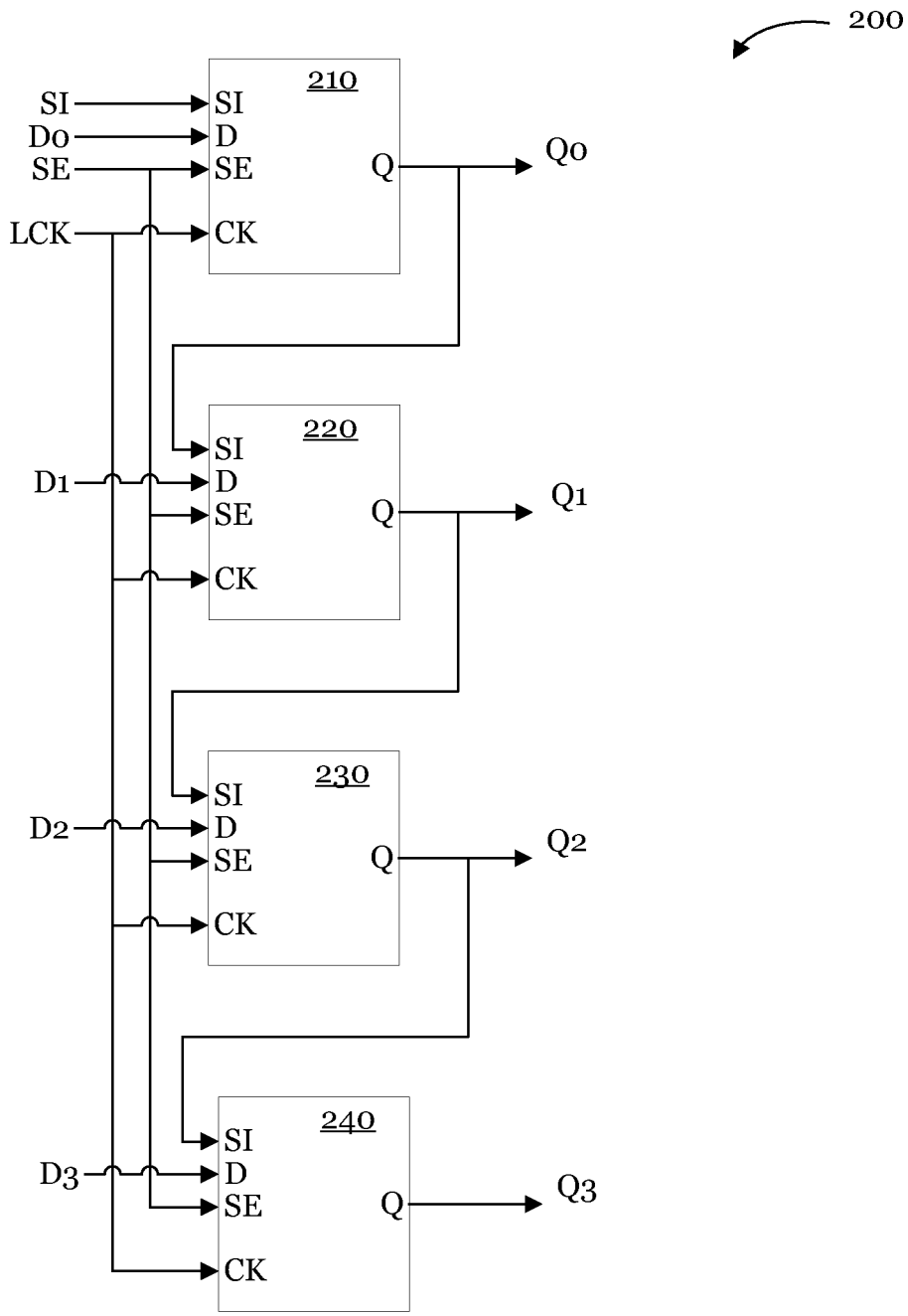
FIG. 2 illustrates a schematic block diagram of an example launch register circuit in accordance with implementations of the invention.
Figure 3:
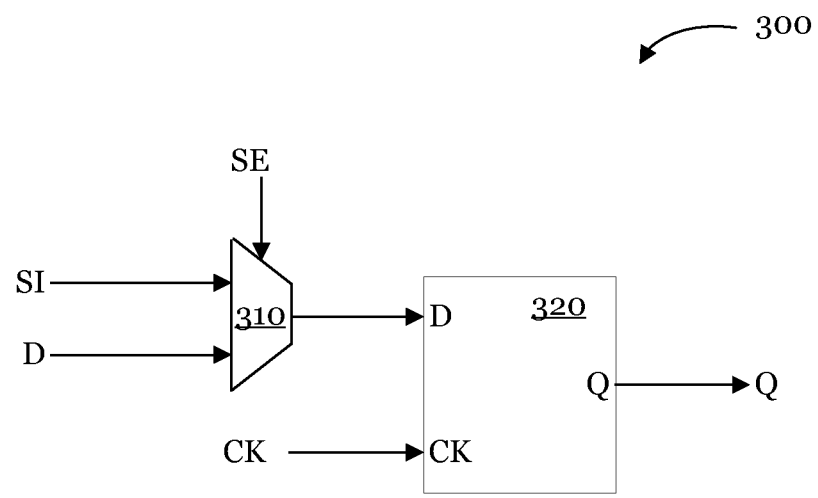
FIG. 3 illustrates a schematic block diagram of an example scannable flip-flop circuit in accordance with implementations of the invention.
Figure 4:
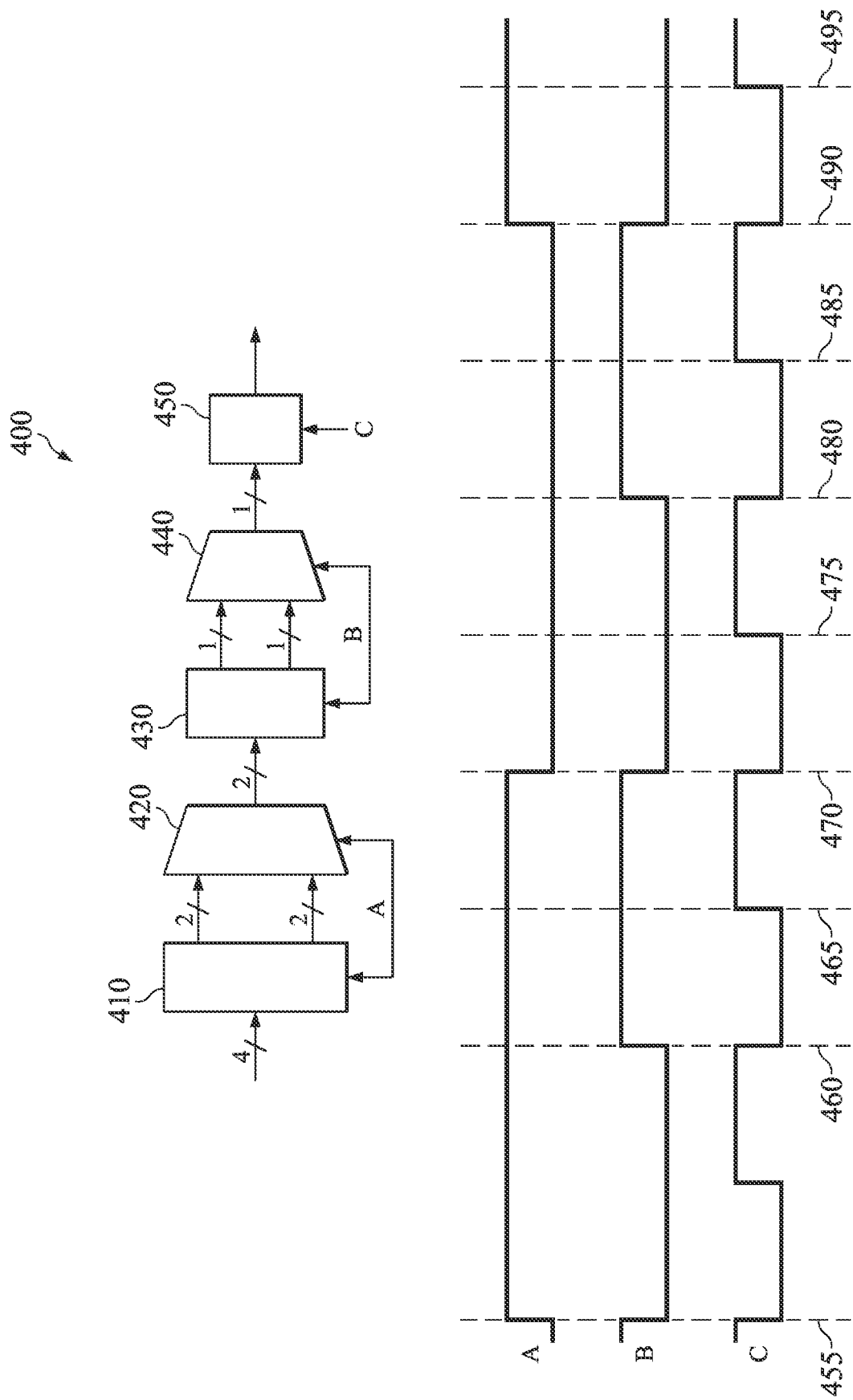
FIG. 4 illustrates a schematic block diagram of an example of a serializer circuit of a transmitter circuit in accordance with implementations of the invention.
Figure 5:
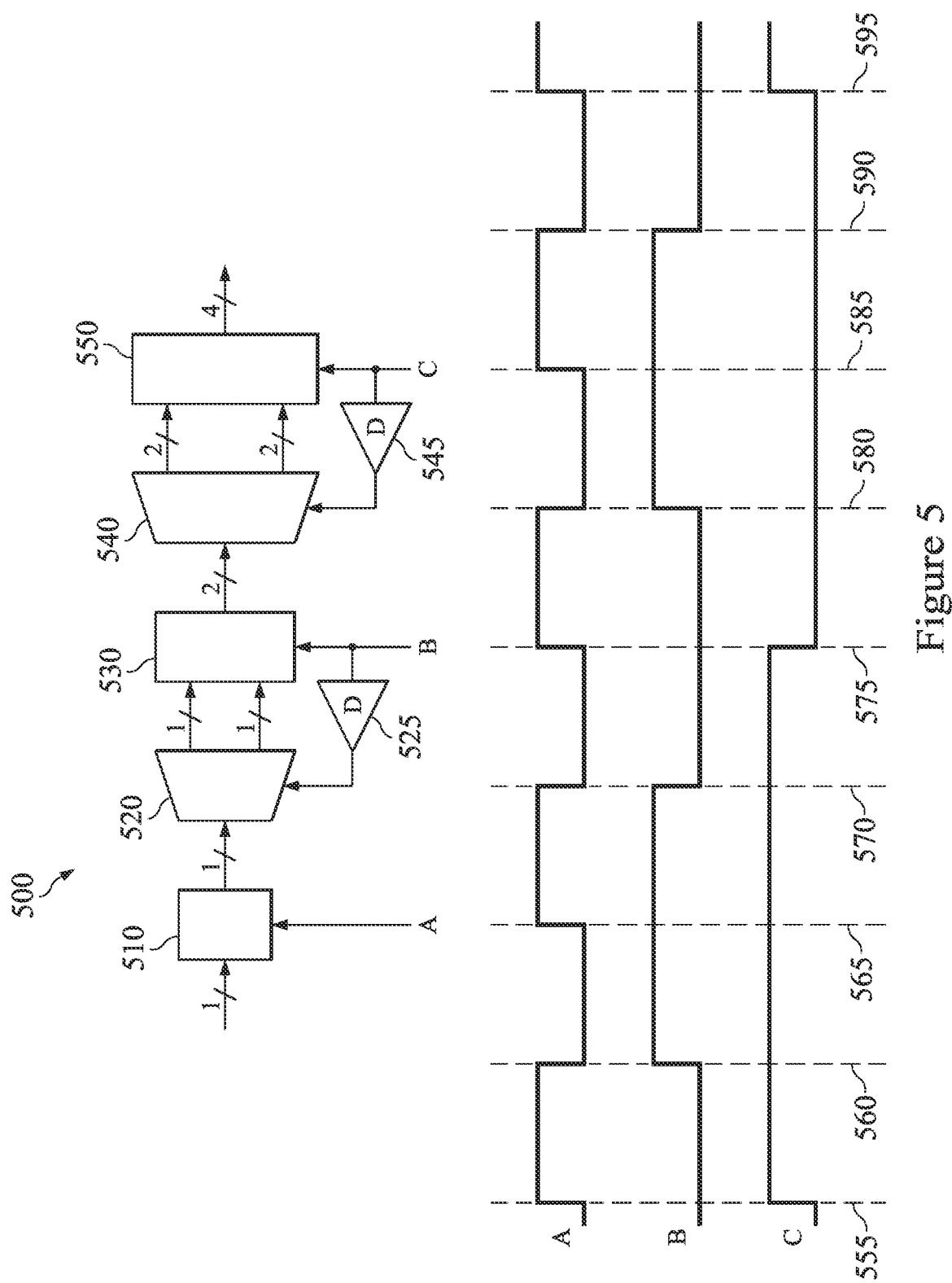
FIG. 5 illustrates a schematic block diagram of an example of a deserializer circuit of a transmitter circuit in accordance with implementations of the invention.
Figure 6:
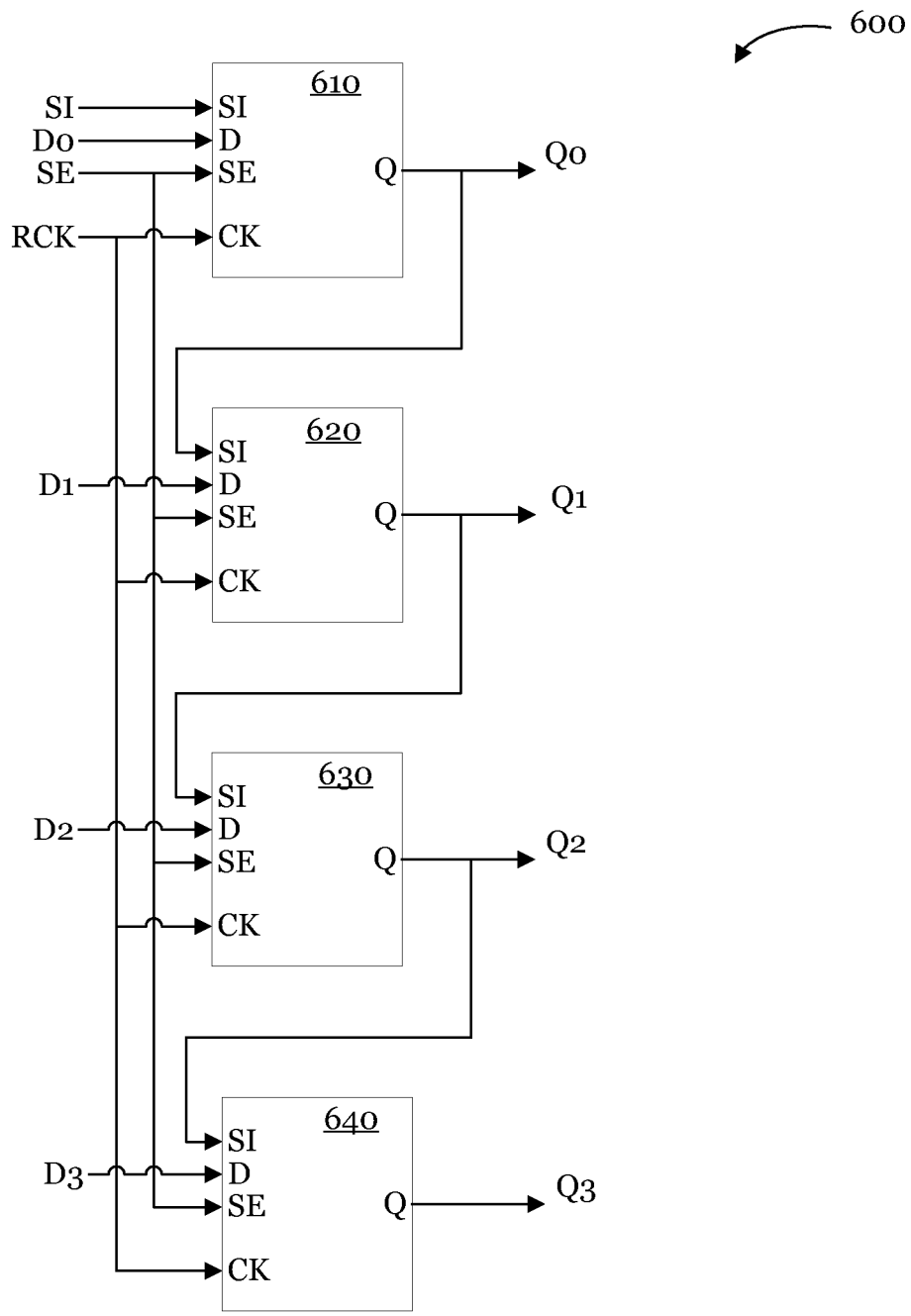
FIG. 6 illustrates a schematic block diagram of an example of a receive register circuit of a transmitter circuit in accordance with implementations of the invention.
Figure 7:
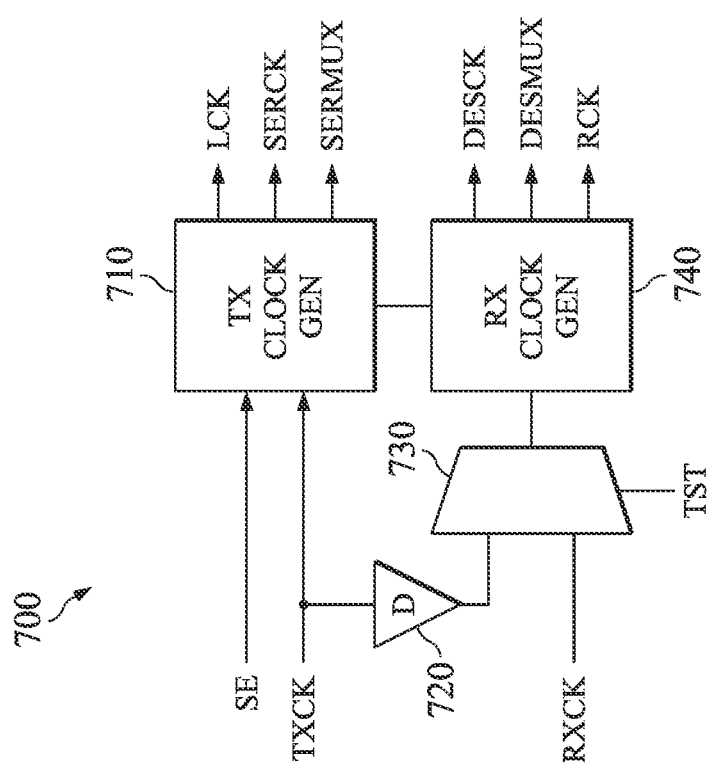
FIG. 7 illustrates a schematic block diagram of an example of a clock generator circuit of a transmitter circuit in accordance with implementations of the invention.
Figure 8:
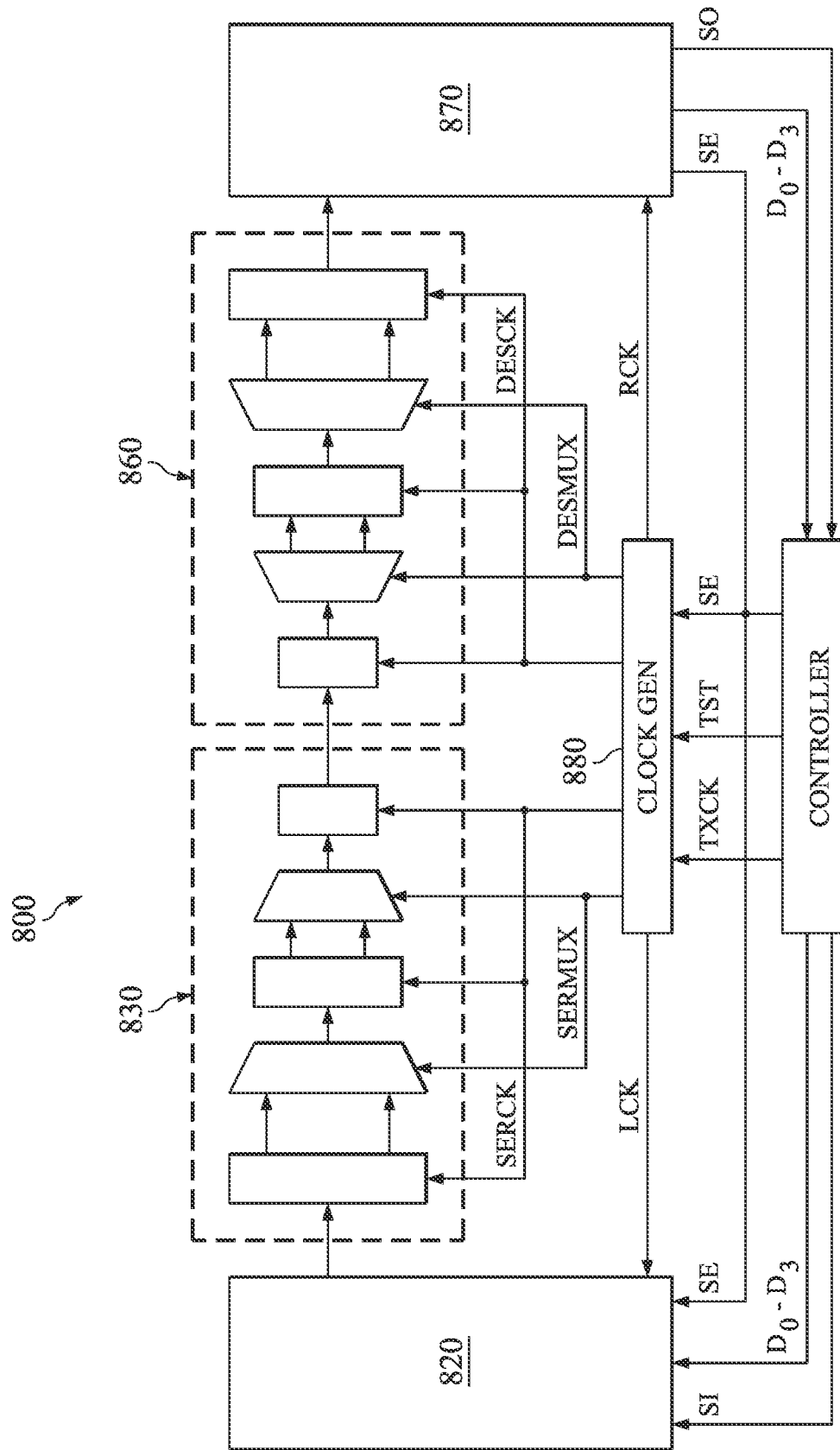
FIG. 8 illustrates a schematic block diagram of an example transceiver circuit including a loopback data path in accordance with implementations of the invention.
Figure 9:
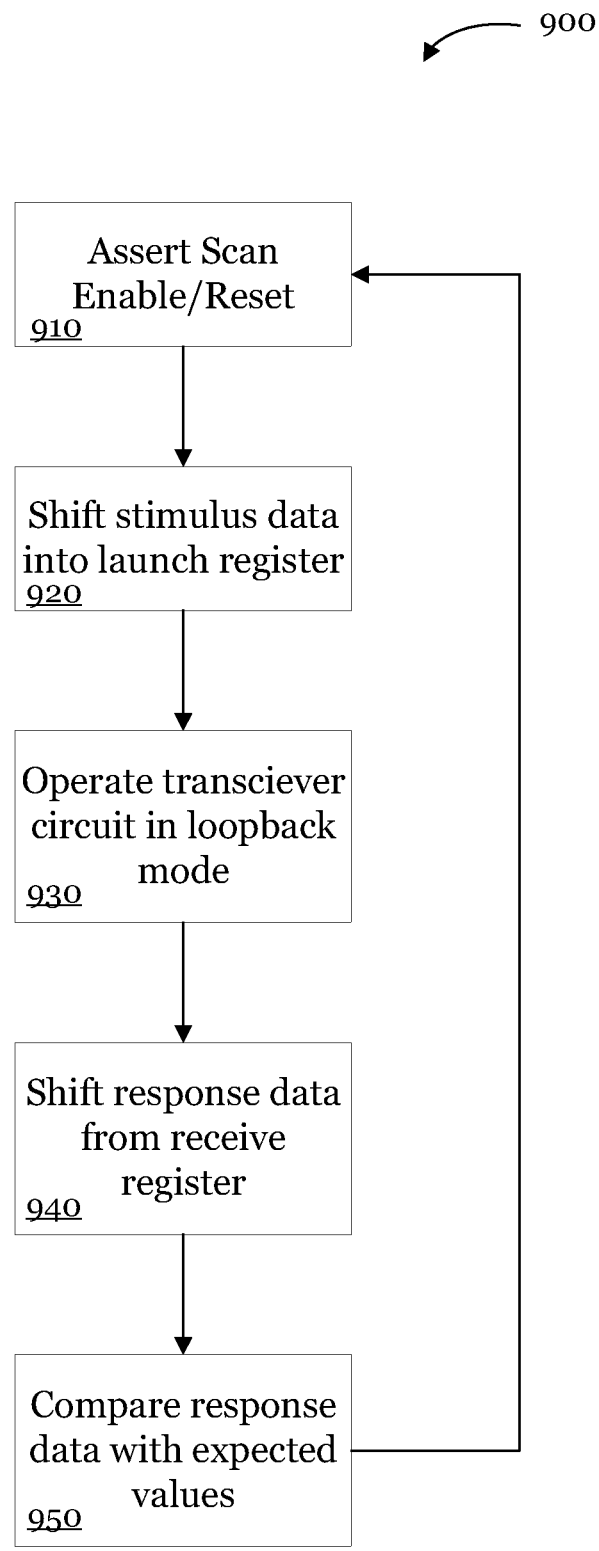
FIG. 9 illustrates a flowchart diagram of an example method of using a transceiver circuit having a loopback data path in accordance with implementations of the invention.

The following description describes certain implementations. FIG. 1 is used to describe an example transceiver circuit. FIG. 2 is used to describe an example launch register circuit. FIG. 3 is used to describe an example scannable flip-flop circuit. FIG. 4 is used to describe an example of a serializer circuit. FIG. 5 is used to describe an example of a deserializer circuit. FIG. 6 is used to describe an example of a receive register circuit. FIG. 7 is used to describe an example of a clock generator circuit. FIG. 8 is used to describe an example transceiver circuit. FIG. 9 is used to describe an example method of using a transceiver circuit.

FIG. 1 illustrates a schematic block diagram of an example transceiver circuit 100 including loopback data path options in accordance with implementations of the invention. Transceiver circuit 100 includes controller circuit 110, launch register circuit 120, serializer circuit 130, transmitter driver circuit 140, digital loopback path 142, on-chip analog loopback path 144, connection pad 145, off chip loopback path 146, receiver amplifier circuit 150, loopback path selection multiplexers 152 and 154, deserializer circuit 160, receive register circuit 170, and clock generation circuit 180.

Controller circuit 110 is configured to generate control signals and data signals, such as those illustrated, to control the other circuits of transceiver circuit 100, or to cause the other circuits of transceiver circuit 100 to perform functions for example, as described elsewhere herein. Controller circuit 110 may be programmable. In some implementations, controller circuit 110 response to stimulus signals (not shown) according to response rules encoded in the circuitry of controller circuit 110 to generate the control and data signals.

Launch register circuit 120 receives control signals at scan enable input SE and data signals and parallel input port D0-D3 and at serial input port SI from controller circuit 110. In the illustrated implementation, launch register circuit 120 also receives a launch clock signal at the clock input port LCK from clock generation circuit 180. In response to the control and data signals from controller circuit 110 and the launch clock signal, launch register circuit 120 receives and stores test data or transmission data, and selectively provides the test data or transmission data to serializer circuit 130 as parallel transmission data.

In some implementations, launch register circuit 120 has a scannable register circuit comprising scannable elements, such as scannable flip-flops. For example, in response to a scan enable signal from controller circuit 110, launch register circuit 120 may be configured to serially load the scannable register circuit with data received at serial input port SI from controller circuit 110 according to the launch clock signal.

Serializer circuit 130 receives the parallel transmission data from launch register circuit 120, receives multiplexer control signals at control input MUX CTRL from clock generation circuit 180, and receives a serializer clock signal at clock input CK from clock generation circuit 180. In response to the test data or transmission data, the multiplexer control signals, and the serializer clock signals, serializer circuit 130 serializes the parallel transmission data by generating serial transmission data.

For example, serializer circuit 130 may receive four bit parallel transmission data from launch register circuit 120. For example, serializer circuit 130 may receive and store four bits of data at a rising edge of each clock cycle of the serializer clock signal. In addition, serializer circuit 130 may, for example, generate four bits of serial data during each clock cycle of the serializer clock signal, where the four generated bits of serial data correspond with or are equal to a set of four bits of parallel data received at a previous clock cycle.

In some implementations, serializer circuit 130 includes registers which are not scannable, as discussed in further detail below.

Transmitter driver circuit 140 is configured to receive the serial data from serializer circuit 130, and to generate an analog transmission signal based on the received serial data. In some embodiments, the serial data is modulated. For example, transmitter driver circuit 140 may be configured to generate an analog transmission signal to be broadcast with a wired channel or with an antenna (not shown). The antenna and its connections to the transmitter driver circuit 140 are not shown for simplification.

Receiver amplifier circuit 150 is configured to receive an analog receive signal from either on-chip analog loopback path 144 or off chip loopback path 146, according to a mux control signal (not shown) from controller circuit 110 at a control input of multiplexer 152. In some embodiments, the analog receive signal is demodulated. Receiver amplifier circuit 150 may additionally be configured to receive analog receive signal from an antenna (not shown). The antenna and its connections to the receiver amplifier circuit 150 are not shown for simplification.

Deserializer circuit 160 is configured to receive serial digital data from either receiver amplifier circuit 150 or digital loopback path 142, according to a mux control signal (not shown) from controller circuit 110 at a control input of multiplexer 154. Deserializer circuit 160 also receives multiplexer control signals at control input MUX CTRL from clock generation circuit 180, and receives a deserializer clock signal at clock input CK from clock generation circuit 180. In response to the serial digital data, the multiplexer control signals, and the deserializer clock signals, deserializer circuit 160 deserializes the serial digital data by generating parallel receive data.

For example, deserializer circuit 160 may receive four bits of serial digital data from multiplexer 154 during every four consecutive cycles of the deserializer clock signal. For example, deserializer circuit 160 may receive and store one of the four bits of data at each rising edge of the deserializer four clock cycles of the deserializer clock signal. In addition, deserializer circuit 160 may, for example, generate four bits of parallel data at each fourth clock cycle of the deserializer clock signal, where the four bits of generated parallel data correspond with or are equal to a set of four bits of serial data received at a set of four consecutive previous clock cycles.

In some implementations, deserializer circuit 160 includes registers which are not scannable, as discussed in further detail below.

Receive register circuit 170 receives control signals at scan enable input SE from controller circuit 110 and parallel data signals from deserializer circuit 160. In the illustrated implementation, receive register circuit 170 also receives a receive clock signal at the clock input port RCK from clock generation circuit 180. In response to the control and data signals, and to all the receive clock signal, receive register circuit 170 receives and stores the parallel data signals, and selectively provides the parallel data signals to controller circuit 110 as either parallel receive data at the parallel receive data input port PDI of controller circuit 110 or serial response data at the serial response data input port SDI of controller circuit 110.

In some implementations, receive register circuit 170 has a scannable register circuit comprising scannable elements, such as scannable flip-flops. For example, in response to a scan enable signal from controller circuit 110, receive register circuit 170 may be configured to serially provide data from the scannable register circuit to serial response data input port SDI of controller circuit 110 according to the receive clock signal.

In this implementation, clock generation circuit 180 receives a transmission clock at transmission clock input TXCK, receives a scan enable signal at scan enable input SE, and receives a receive clock at receive clock input RXCK. In addition, clock generation circuit 180 generates a launch register clock for launch register circuit 120 at launch register clock output LCK, generates mux control signals for serializer circuit 130 at mux control output SMUX, generates a serializer clock signal for serializer circuit 130 at serializer clock output SCK, generates a receive register clock signal for receiver register circuit 170 at receive register clock output RCK, generates mux control signals for deserializer circuit 160 at mux control output DMUX, and generates a deserializer clock signal for deserializer circuit 160 at deserializer clock output DCK based at least in part on the transmission clock, the scan enable signal, and the receive clock.

Accordingly, to test transceiver circuit 100, controller circuit 110 may be configured to serially load launch register circuit 120 with test pattern data, generated, for example, with an automatic test pattern generator based on the circuits of the transceiver circuit 100 to be tested with the test pattern data. After the test pattern data is loaded into the launch register circuit 120, the controller circuit 110 may be configured to provide signals which: 1) cause the test pattern data to be provided to the serializer circuit 130 so that the serializer circuit 130 generates serialized test pattern data; 2) cause serial test data to be received at the deserializer circuit 160, via any of digital loopback path 142, on-chip analog loopback path 144, and off chip loopback path 146 so that the deserializer circuit 160 generates parallel response data; and 3) cause the receive register circuit 170 to receive and store the parallel response data from deserializer circuit 160. After receive register circuit 170 stores the parallel response data, controller circuit 110 may be configured to serially receive serial response data corresponding with the parallel response data from receive register circuit 170 at serial response data input port SDI of controller circuit 110.

In order for transceiver circuit 100 to generate predictable parallel response data as a consequence of the test pattern data stimulus, portions of the clock generation circuit 180 may be placed in a known state with a reset operation. In some implementations, the clock generation circuit 180 uses the scan enable signal at scan enable input SE as a reset signal to reset the portions of clock generation circuit 180 to a known state. Accordingly, while the launch register circuit 120 is being loaded with test pattern data, the appropriate portions of the clock generation circuit 180 are being reset. In some implementations, a functional reset signal other than the scan enable signal may be used to reset the portions of clock generation circuit 180. In some implementations, the portions of clock generation circuit 180 are reset either by the scan enable signal or by the functional reset signal.

In some implementations, controller circuit 110 or another circuit may be configured to process the received response data to test the transceiver circuit 100 by, for example, determining whether the transceiver circuit 100 has functioned properly when generating the received response data. In some implementations, controller circuit 110 or another circuit may be configured to process the received response data to determine which circuit of transceiver circuit 110 has not functioned properly. In some implementations, controller circuit 110 or another circuit may be configured to process the received response data to determine that a particular portion of one or more of the circuits of transceiver circuit 110 has not functioned properly. In some implementations, controller circuit 110 or another circuit may be configured to generate additional test patterns for transceiver circuit 100 based on the received response data to isolate a cause of failure to a particular circuit of transceiver circuit 100 or to a portion of a particular circuit of transceiver circuit 100. In some implementations, controller circuit 110 or another circuit may be configured to process the received response data to determine coverage or effectiveness or thoroughness of the test pattern stimulus data.

FIG. 2 illustrates a schematic block diagram of an example launch register circuit 200 in accordance with implementations of the invention. Launch register circuit 200 includes scannable data storage devices 210, 220, 230, and 240 connected in a scan chain configuration. In the illustrated implementation, launch register circuit 200 receives and stores four bits. Other implementations receive and store different numbers of bits, and the number of bits is not limited by this disclosure. Launch register circuit 200 may be used as launch register circuit 120 of transceiver circuit 100, and includes features similar or identical to those discussed with reference to launch register circuit 120. Other scannable register circuit structures may be used as launch register circuit 120 of transceiver circuit 100.

Storage devices 210, 220, 230, and 240 are scannable, and may each include a data latching circuit, such as a flip-flop. In addition, storage devices 210, 220, 230, and 240 are arranged to form a register circuit.

Parallel data may be loaded into launch register circuit 200 by applying the data to data inputs D0-D3 while applying a clock signal to clock input LCK with the scan enable signal applied to scan enable input SE indicating that the scan function is off. Once the parallel data is loaded into launch register circuit 200, the parallel data is presented at the outputs Q0-Q3.

Four bits of serial data may be loaded into launch register circuit 200 by serially applying the data to serial data input SI connected to storage device 210 while applying a clock signal to clock input LCK with the scan enable signal applied to scan enable input SE indicating that the scan function is on. Once the four bits of serial data are loaded into launch register circuit 200, the four bits of serial data is presented, in parallel, at the outputs Q0-Q3.

Four bits of serial data may be read from launch register circuit 200 by serially reading the data from output Q3 while applying a clock signal to clock input LCK with the scan enable signal applied to scan enable input SE indicating that the scan function is on.

In alternative embodiments, the data from output Q3 may be provided to input SI of storage device 210, for example, with a multiplexor having data inputs, for example, connected to the output Q3 and the input SI of launch register circuit 200, a control input connected to the input SE, and an output connected to the input SI of storage device 210. Accordingly, the data in launch register circuit 200 may be recirculated. For example, a particular test sequence may be loaded into launch register circuit 200, and recirculated, for example, instead of being received from a controller. For example, a 1100 test pattern may be serially or parallel loaded into launch register circuit 200, and the same 1100 test pattern may be used for consecutive cycles by recirculating the 1100 test pattern, for example, instead of receiving new data from a controller. This may be particularly advantageous when the system is tested using a protocol defined by a standard which calls for repeated test patterns, such as a universal chiplet interconnect express (UCIe) standard.

FIG. 3 illustrates a schematic block diagram of an example scannable storage device 300 in accordance with implementations of the invention. Scannable storage device 300 includes multiplexer 310 and data latching circuit 320. Scannable storage device 300 may be used as any or all of scannable storage devices 210, 220, 230, and 240 of launch register circuit 200, and includes features similar or identical to those discussed with reference to scannable storage devices 210, 220, 230, and 240. Other scannable storage devices may be used as scannable storage devices 210, 220, 230, and 240 of launch register circuit 200.

One bit of data may be loaded into scannable storage device 300 by applying the data to data input D connected to multiplexer 310 while applying a clock signal to clock input CK with the scan enable signal applied to scan enable input SE indicating that the scan function is off so that the data input D is electrically connected to the data input D of latching circuit 320. Once data is loaded into scannable storage device 300, the data is presented at the output Q.

One bit of data may be loaded into scannable storage device 300 by applying the data to scan data input SI connected to multiplexer 310 while applying a clock signal to clock input CK with the scan enable signal applied to scan enable input SE indicating that the scan function is on so that the scan data input SI is electrically connected to the data input D of latching circuit 320. Once data is loaded into scannable storage device 300, the data is presented at the output Q.

FIG. 4 illustrates a schematic block diagram of an example of a serializer circuit 400 for a transceiver circuit in accordance with implementations of the invention. Serializer circuit 400 includes four bit register circuit 410, two bit multiplexer 420, two bit register circuit 430, one bit multiplexer 440, and one bit register 450. In the illustrated implementation, serializer circuit 400 receives four bits of parallel data at four bit register circuit 410, and generate serial data output at register 450. Other implementations receive different numbers of parallel bits at a first register circuit, and produce serial data, and the number of parallel bits received at the first register circuit is not limited by this disclosure. Serializer circuit 400 may be used as serializer circuit 130 of transceiver circuit 100, and includes features similar or identical to those discussed with reference to serializer circuit 130. In some implementations, other serializer circuit structures may be used in serializer circuit 130 of transceiver circuit 100.

At time 455, the rising edge of clock A causes four bits of data to be latched into four bit register circuit 410, and the high state of clock A causes two bit multiplexer 420 to connect the inputs of two bit register 430 to a first two of the outputs of four bit register circuit 410. At time 460, the rising edge of clock B causes the two bits of the output of four bit register circuit 410 to be latched into two bit register circuit 430, and the high state of clock B causes one bit multiplexer 440 to connect the input of one bit register 450 to a first of the outputs of two bit register circuit 430. At time 465, the rising edge of clock C causes the first output of two bit register circuit 430 to be latched into one bit register circuit 450.

At time 470, the low state of clock A causes two bit multiplexer 420 to connect the inputs of two bit register 430 to the other of two of the outputs of four bit register circuit 410, and the low state of clock B causes one bit multiplexer 440 to connect the input of one bit register 450 to the other of the outputs of two bit register circuit 430. At time 475, the rising edge of clock C causes the second output of two bit register circuit 430 to be latched into one bit register circuit 450. At time 480, the rising edge of clock B causes the two other bits of the output of four bit register circuit 410 to be latched into two bit register circuit 430, and the high state of clock B causes one bit multiplexer 440 to connect the input of one bit register 450 to the first of the outputs of two bit register circuit 430. At time 485, the rising edge of clock C causes the first output of two bit register circuit 430 to be latched into one bit register circuit 450.

At time 490, the low state of clock B causes one bit multiplexer 440 to connect the input of one bit register 450 to the other of the outputs of two bit register circuit 430. At time 495, the rising edge of clock C causes the other output of two bit register circuit 430 to be latched into one bit register circuit 450.

Accordingly, at time 455, four bits are latched by four bit register circuit 410, and each of the four rising edges of clock C at times 465, 475, 485, and 495 causes a different bit of the four bits to be latched by one bit register 450. In addition, the pattern repeats with the rising edge of clock A at time 490 corresponding with the rising edge of clock A at time 455. Accordingly, each rising edge of clock A cause four bits of data to be latched at four bit register circuit 410, and the subsequent second, third, fourth, and fifth rising edges of clock C cause those four bits to be sequentially latched by one bit register 450. As a result, the one bit register 450 outputs serialized data corresponding with the parallel data received at four bit register circuit 410.

In some implementations, four bit register circuit 410, two bit register circuit 430, and one bit register circuit 450 are not scannable register circuits, for example, as a result of not having the circuit structures making them scannable, such as the multiplexer 310 of scannable storage device 300. In some implementations, four bit register circuit 410 is a scannable register circuit, and two bit register circuit 430 and one bit register circuit 450 are not scannable register circuits. In some implementations, four bit register circuit 410 and two bit register circuit 430 are scannable register circuits, and one bit register circuit 450 is not a scannable register circuit. In implementations having scannable register circuits, the scannable register circuits may be used, for example, to test and/or debug the serializer circuit 400 and/or to test and/or debug other circuits.

In some implementations, two bit multiplexer circuit 420 receives a control signal other than clock signal A. In some implementations, one bit multiplexer circuit 440 receives a control signal other than clock signal B.

Numerous other implementations may be used. For example, in some implementations, the parallel data is directly sampled and converted to serial data in a single stage having four single-bit registers each clocked with one of four four-phase clocks at the parallel clock rate and a four to one mux clocked at the serial rate.

FIG. 5 illustrates a schematic block diagram of an example of a deserializer circuit 500 of a transceiver circuit in accordance with implementations of the invention. Deserializer circuit 500 includes one bit register 510, one bit multiplexer 520, clock delay circuit 525, two bit register circuit 530, two bit multiplexer circuit 540, clock delay circuit 545, and four bit register circuit 550. In the illustrated implementation, deserializer circuit 500 receives serial data at register circuit 510, and generates parallel data output at four bit register circuit 550. Other implementations generate different numbers of parallel bits at a last register circuit based on received serial data, and the number of parallel bits generated at the last register circuit is not limited by this disclosure. Deserializer circuit 500 may be used as deserializer circuit 160 of transceiver circuit 100, and includes features similar or identical to those discussed with reference to deserializer circuit 160. In some implementations, the other deserializer circuit structures may be used as deserializer circuit 160 of transceiver circuit 100.

At time 555, the rising edge of clock A causes one bit register 510 to latch a first bit, and because clock B is low, the first bit is received at a first of the inputs of two bit register 530. At time 560, the rising edge of clock B causes the first bit to be latched at a first part of two bit register 530.

At time 565, the rising edge of clock A causes one bit register 510 to latch a second bit, and because clock B is high, the second bit is received at the second of the inputs of two bit register 530. At time 570, the falling edge of clock B causes the second bit to be latched at the second part of two bit register 530, leaving the first bit latched in the first part of two bit register 530.

At time 575, the falling edge of clock C causes the first and second bits latched by two bit register 530 to be latched by a first part of four bit register 550, where the first part is selected based on the clock C being high.

At time 575, the rising edge of clock A causes one bit register 510 to latch a third bit, and because clock B is low, the third bit is received at the first of the inputs of two bit register 530. At time 580, the rising edge of clock B causes the third bit to be latched at the first part of two bit register 530.

At time 585, the rising edge of clock A causes one bit register 510 to latch a fourth bit, and because clock B is high, the fourth bit is received at the second of the inputs of two bit register 530. At time 590, the falling edge of clock B causes the fourth bit to be latched at the second part of two bit register 530, leaving the third bit latched in the first part of two bit register 530.

At time 595, the rising edge of clock C causes the third and fourth bits latched by two bit register 530 to be latched by the second part of four bit register 550, where the second part is selected based on the clock C being low, leaving the first and second bits latched in the first part of four bit register 550.

Accordingly, at times 555, 565, 575, and 585 each of four serial bits are sequentially latched by one bit register circuit 510. In addition, at times 560 and 570, the first and second serial bits latched by one bit register circuit 510 are respectively latched by two bit register circuit 530, and at time 575, the first and second serial bits latched at two bit register 530 are latched at four bit register 550. Furthermore, at times 580 and 590, the third and fourth serial bits latched by one best register circuit 510 are respectively latched by two bit register circuit 530, and at time 595, the third and fourth serial bits latched at two bit register 530 are latched at four bit register circuit 550. Accordingly, at times 555, 565, 575, and 585 each of four serial bits are sequentially latched by one bit register circuit 510, and at time 595, the four bits are latched at four bit register 550 and are provided to the four bit parallel output of deserializer circuit 500.

In some implementations, one bit register circuit 510, two bit register circuit 530, and four bit register circuit 550 are not scannable register circuits, for example, as a result of not having the circuit structures making them scannable, such as the multiplexer 310 of scannable storage device 300. In some implementations, one bit register circuit 510 and two bit register circuit 530 are not scannable register circuits, and four bit register circuit 550 is a scannable register circuit. In some implementations, one bit register circuit 510 is not a scannable register circuit, and two bit register circuit 530 and four bit register circuit 550 are scannable register circuits. In implementations having scannable register circuits, the scannable register circuits may be used, for example, to test and/or debug the deserializer circuit 500 and/or to test and/or debug other circuits.

In some implementations, one bit multiplexer circuit 520 receives a control signal other than a delayed clock signal B. In some implementations, two bit multiplexer circuit 540 receives a control signal other than a delayed clock signal C.

Numerous other implementations may be used. For example, in some implementations, the serial data is directly sampled and converted to serial data in a single stage having four single-bit registers each clocked with one of four four-phase clocks at the parallel clock rate.

FIG. 6 illustrates a schematic block diagram of an example of a receive register circuit 600 for a transceiver circuit in accordance with implementations of the invention. Receive register circuit 600 includes data storage devices 610, 620, 630, and 640 connected in a scan chain configuration. In the illustrated implementation, receive register circuit 600 receives and stores four bits. Other implementations receive and store different numbers of bits, and the number of bids is not limited by this disclosure. Receive register circuit 600 may be used as receive register circuit 170 of transceiver circuit 100, and includes features similar or identical to those discussed with reference to receive register circuit 170. Other scannable register circuit structures may be used as receive register circuit 170 of transceiver circuit 100.

Storage devices 610, 620, 630, and 640 are scannable, and may each include a data latching circuit, such as a flip-flop. For example, storage devices 610, 620, 630, and 640 may include a scannable storage device, such as scannable storage device 300, discussed above. In addition, storage devices 610, 620, 630, and 640 are arranged to form a register circuit.

Parallel data may be loaded into receive register circuit 600 by applying the data to data inputs D0-D3 while applying a clock signal to clock input RCK with the scan enable signal applied to scan enable input SE indicating that the scan function is off. Once the parallel data is loaded into receive register circuit 600, the parallel data is presented at the outputs Q0-Q3.

Four bits of serial data may be loaded into receive register circuit 600 by serially applying the data to serial data input SI connected to storage device 610 while applying a clock signal to clock input LCK with the scan enable signal applied to scan enable input SE indicating that the scan function is on. Once the four bits of serial data are loaded into receive register circuit 600, the four bits of serial data is presented, in parallel, at the outputs Q0-Q3.

Four bits of serial data may be read from receive register circuit 600 by serially reading the data from output Q3 while applying a clock signal to clock input LCK with the scan enable signal applied to scan enable input SE indicating that the scan function is on.

FIG. 7 illustrates a schematic block diagram of an example of a clock generator circuit 700 of a transceiver circuit in accordance with implementations of the invention. Clock generator circuit 700 includes transmitter clock generator 710, delay circuit 720, multiplexer 730, and receiver clock generator 740. In the illustrated implementation, clock generator circuit 700 receives a transmit clock at transmit clock input TXCK, receives a receive clock at receive clock input RXCK, receives a scan enable signal at scan enable input SE, receives a test enable signal at test input TST, and generates a launch register clock signal at launch clock output LCK, a serializer clock signal at serializer clock output SERCK, a serializer multiplexer control signal at serializer multiplexer control output SERMUX, a deserializer clock signal and deserializer clock output DESCK, a deserializer multiplexer control signal at serializer multiplexer control output DESMUX, and a receive register clock signal and receive register clock output RCK. Clock generator circuit 700 may be used as receive register circuit 170 of transceiver circuit 100, and includes features similar or identical to those discussed with reference to receive register circuit 170. Other scannable register circuit structures may be used as receive register circuit 170 of transceiver circuit 100.

Transmitter clock generator 710 receives the transmit clock from transmit clock input TXCK, and receives the scan enable signal from scan enable input SE. In addition, transmitter clock generator 710 generates the launch register clock signal and serializer clock signal.

In some implementations, transmitter clock generator 710 uses the transmit clock as the launch register clock signal. In some implementations, transmitter clock generator 710 generates the launch register clock signal based on the transmit clock. For example, the launch register clock signal may be a buffered, and/or inverted version of the transmit clock.

In some implementations, transmitter clock generator 710 generates the serializer clock signal and the serializer multiplexer control signal based on the transmit clock. For example, transmitter clock generator 710 may include a counter circuit which is clocked by the transmit clock, or a derivative of the transmit clock to generate the serializer clock signal and the serializer multiplexer control signal. For example, in some implementations, the counter circuit may generate signals corresponding with clock signals A, B, and C of FIG. 4, which illustrates serializer circuit 400. In some implementations, the scan enable signal is used to reset the counter circuit. Therefore, in some implementations while the launch register is being serially loaded with test pattern data, the counter circuit is reset, and, once the test pattern data is loaded, the scan enable signal changes states. As a result, the test pattern data from the launch register is received by the serializer circuit when the counter circuit is in a known, properly initialized, state.

Receiver clock generator 740 either receives the receive clock from receive clock input RXCK or receives a delayed version of the transmit clock from transmit clock input TXCK, according to a switching state of multiplex or 730 based on a test enable signal at test input TST from a controller, such as controller circuit 110. If the circuit is being tested, the test enable signal causes the receiver clock generator 742 receive the transmit clock delayed by delay circuit 720. Otherwise, the receiver clock generator 740 receives the receive clock from receive clock input RXCK. In addition, receiver clock generator 740 generates the deserializer clock signal and the receive register clock signal.

Receiver clock generator 740 uses the clock signal received from multiplexer 730 to generate the deserializer clock signal, the deserializer multiplexer control signal, and the receive register clock signal. When the clock signal from multiplexer 730 is the receive clock from clock input RXCK, the deserializer clock signal, the deserializer multiplexer control signal, and the receive register clock signal have proper frequency and alignment relative to receiver data because of the frequency and the alignment of the receive clock from clock input RXCK. When the clock signal from multiplexer 730 is a delayed version of the transmit clock, the deserializer clock signal, the deserializer multiplexer control signal, and the receive register clock signal have proper frequency relative to the receiver data because of the frequency of the transmit clock, and the deserializer clock signal, the deserializer multiplexer control signal, and the receive register clock signal at proper alignment relative to the receiver data because of the delay of delay circuit 720.

In some implementations, the delay of delay circuit 720 is correct by design. In some implementations, the delay of delay circuit 720 is programmable. For example, delay circuit 720 may be configured to receive control signals from a controller which generates control signals based on a series of functionality tests, for example, to characterize the transceiver circuit with respect to proper delay of delay circuit 720.

In some implementations, receiver clock generator 740 generates the deserializer clock signal and the deserializer multiplexer control signal based on the clock signal received from multiplexer 730. For example, receiver clock generator 740 may include a counter circuit which is clocked by the clock signal from multiplexer 730, or a derivative of that clock signal to generate the deserializer clock signal and the deserializer multiplexer control signal. For example, in some implementations, the counter circuit may generate signals corresponding with clock signals A, B, and C, and delayed clock signals B and C of FIG. 5, which illustrates deserializer circuit 500. In some implementations, the scan enable signal is used to reset the counter circuit. Therefore, in some implementations while the launch register is being serially loaded with test pattern data and the serializer circuit is being reset, the counter circuit of the receiver clock generator 740 is also reset. Therefore, once the test pattern data is loaded and the scan enable signal changes states, data is received by the deserializer circuit with the counter circuit being in a known, properly initialized, state.

In some implementations, receiver clock generator 740 generates the receive register clock regardless of the state of the scan enable signal. In some implementations, receiver clock generator 740 generates the receive register clock signal regardless of the state of the test enable signal. As a result, the receive register functions based on the receiver register clock signal in any of the operational modes.

FIG. 8 illustrates a schematic block diagram of an example transceiver circuit 800 in a loopback test configuration in accordance with implementations of the invention. Transceiver circuit 800 includes controller 810, launch register circuit 820, serializer circuit 830, deserializer circuit 860, receive register circuit 870, and clock generation circuit 880. Transceiver circuit 800 includes features and aspects similar or identical to those described above with reference to transceiver circuit 100. In addition, each of the corresponding components of transceiver circuit 800 may comprise features and aspect similar or identical to those described above with reference to the corresponding components of transceiver circuit 100.

To test the transceiver circuit 800 with a loopback test, controller 810 asserts the scan enable signal on node SE and causes test pattern data to be serially presented to launch register circuit 820 on node SI. While the scan enable signal is asserted, clock generation circuit 880 resets counter circuits used to generate the serializer clock signal, the serializer multiplexer control signal, the deserializer clock signal, and the deserializer multiplexer control signal. In addition, while the scan enable signal is asserted, the test pattern data is serially loaded into launch register 820.

Once the test pattern data is loaded into launch register 820, controller 810 deasserts the scan enable signal and asserts the test enable signal at node TST. As a result, transceiver circuit 800 is in the loopback test mode, and the test pattern data may be repeatedly loaded into serializer 830, and serialized by serializer 830 to generate serialized data. The serialized data is also provided to the deserializer 860, deserialized by deserializer circuit 860, and the deserialized data is loaded into receive register circuit 870. Accordingly, once the deserialized data is loaded into receive register 870, the data in receive register 870 is generated, in part, by each of the components of serializer circuit 830.

After the deserialized data is loaded into receive register 870, the controller may again assert the scan enable signal to cause the deserialized data in the receive register 870 to be serially loaded into controller 810 at node SO. In some implementations, while the deserialized data is being serially loaded into controller 810, additional test pattern data is simultaneously or substantially simultaneously serially loaded from controller 810 into launch register 820.

After the deserialized data is loaded into controller 810, controller 810 or another circuit may be configured to compare the deserialized data or to compare groups of loaded deserialized data to expected data values to determine whether the components of transceiver circuit 800 are functioning properly. In some implementations, controller circuit 110 or another circuit may be configured to process the received deserialized data to determine whether the transceiver circuit 800 has functioned properly. In some implementations, controller 810 or another circuit may be configured to process the received deserialized data to determine which circuit of transceiver circuit 800 has not functioned properly. In some implementations, controller 810 or another circuit may be configured to process the received deserialized data to determine that a particular portion of one or more of the circuits of transceiver circuit 800 has not functioned properly. In some implementations, controller circuit 110 or another circuit may be configured to generate additional test patterns for transceiver circuit 800 based on the received deserialized data to isolate a cause of failure to a particular circuit of transceiver circuit 800 or to a portion of a particular circuit of transceiver circuit 800. In some implementations, controller 810 or another circuit may be configured to process the received response data to determine coverage or effectiveness or thoroughness of the test pattern stimulus data.

FIG. 9 illustrates a flowchart diagram of an example method 900 of using a transceiver circuit having a loopback data path in accordance with implementations of the invention. Method 900 may be performed by a transceiver circuit, such as transceiver circuit 100 or transceiver circuit 800. Method 900 may be performed by a controller for a transceiver circuit, such as controller circuit 110 or controller 810. In some implementations, the actions performed as part of method 900 are performed in accordance with aspects discussed with reference to the functionality of transceiver circuits 100 and 800, and their components.

At step 910, a controller asserts a scan enable signal for the transceiver circuit. In response to the asserted scan enable signal, a clock generation circuit of the transceiver circuit resets one or more of generation circuits used to generate, for example, clock signals for a serializer of the transceiver circuit, multiplexer control signals for the serializer, clock signals for a deserializer of the transceiver circuit, and multiplexer control signals for the deserializer circuit.

At step 920, the controller causes test pattern data to be serially loaded into a scannable launch register circuit of the transceiver circuit. For example, test pattern data generated using an automatic test pattern generation system may be stored in a memory and serially loaded into the scannable launch register circuit.

At step 930, the controller causes the transceiver circuit to operate in a loopback mode. As a result of operating in the loopback mode, data from the launch register circuit is transferred to the serializer circuit which generates an output. In addition, the output of the serializer circuit induces input signals for the deserializer circuit. The input signals are processed by the deserializer circuit, and the output generated by the deserializer circuit is latched into a scannable receive register circuit.

At step 940, the data from the scannable receive register circuit is serially loaded into the controller.

At step 950, the controller causes the data serially loaded into the controller to be compared with expected values to determine functionality of the transceiver circuit and/or functionality of components of the transceiver circuit.

Various example implementations are provided in the following. Other implementations may be understood from the entirety of the specification as well as the claims filed herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect is a transceiver circuit, including a first register circuit, configured to receive serial stimulus data and to generate multi-bit parallel stimulus data, a serializer circuit configured to receive the multi-bit parallel stimulus data and to generate serialized data based on the multi-bit parallel stimulus data, where the serializer circuit includes a serializer data storage device, and where the serializer data storage device lacks circuit structures for scanability, a deserializer circuit configured to receive serial receiver data corresponding with the serialized data and to generate multi-bit parallel response data based on the serial receiver data, where the deserializer circuit includes a deserializer data storage device, and where the deserializer data storage device lacks circuit structures for scanability, and a second register circuit, configured to receive the multi-bit parallel response data and to generate serial response data.

Implementations may include one or more of the following features. The transceiver circuit where the serialized data forms a first sequence of bit values, where the serial receiver data received by the deserializer circuit forms a second sequence of bit values, and where the first sequence of bit values is equal to the second sequence of bit values. The transceiver circuit where the serial receiver data received by the deserializer circuit is generated based at least in part on an analog signal, and where the analog signal is generated based at least in part on the serialized data. The transceiver circuit where the first register circuit is configured to receive a test pattern, and to recirculate the test pattern according to a test standard. The transceiver circuit where the deserializer circuit is configured to receive the serial data in response to a first clock signal having a first frequency, where the deserializer circuit is configured to generate the multi-bit parallel response data in response to a second clock signal having a second frequency, where the second frequency is less than the first frequency. The transceiver circuit where the serializer circuit is configured to generate the serialized data in response to a first clock signal, where the deserializer circuit is configured to receive the serial receiver data in response to a second clock signal, and where the first and second clock signals are both derived from a single third clock signal. The transceiver circuit where the serializer circuit is configured to generate the serialized data in response to the first clock signal, where the deserializer circuit is configured to receive the serial receiver data in response to the second clock signal, and where the first and second clock signals have a phase difference controlled at least in part by a delay of a delay circuit. The transceiver circuit further including a first resettable clock circuit configured to generate a first clock signal, and a second resettable clock circuit configured to generate a second clock signal, where the first and second resettable clock circuits are configured to be reset with a scan enable signal, where the serializer circuit is configured to generate the serialized data in response to the first clock signal, where the deserializer circuit is configured to receive the serial receiver data in response to the second clock signal, and where the first register circuit is configured to receive the serial stimulus data in response to the scan enable signal.

Another general aspect is a system, including a controller, and a transceiver circuit, including a first register circuit, configured to receive serial stimulus data and to generate multi-bit parallel stimulus data, a serializer circuit configured to receive the multi-bit parallel stimulus data and to generate serialized data based on the multi-bit parallel stimulus data, where the serializer circuit includes a serializer data storage device, and where the serializer data storage device lacks circuit structures for scanability, a deserializer circuit configured to receive serial receiver data corresponding with the serialized data and to generate multi-bit parallel response data based on the serial receiver data, where the deserializer circuit includes a deserializer data storage device, and where the deserializer data storage device lacks circuit structures for scanability, and a second register circuit, configured to receive the multi-bit parallel response data and to generate serial response data, where the controller is configured to provide the serial stimulus data to the first register circuit with a first scan operation, and where the controller is configured to receive the serial response data from the second register circuit in a second scan operation.

Implementations may include one or more of the following features. The system where the serialized data forms a first sequence of bit values, where the serial data received by the deserializer circuit forms a second sequence of bit values, and where the first sequence of bit values is equal to the second sequence of bit values. The system where the serial receiver data received by the deserializer circuit is generated based at least in part on an analog signal, and where the analog signal is generated based at least in part on the serialized data. The system where the first register circuit is configured to receive a test pattern, and to recirculate the test pattern according to a test standard. The system where the deserializer circuit is configured to receive the serial receiver data in response to a first clock signal having a first frequency, where the deserializer circuit is configured to generate the multi-bit parallel response data in response to a second clock signal having a second frequency, where the second frequency is less than the first frequency. The system where the serializer circuit is configured to generate the serialized data in response to a first clock signal, where the deserializer circuit is configured to receive the serial receiver data in response to a second clock signal, and where the first and second clock signals are both derived from a single third clock signal. The system of example 14, where the serializer circuit is configured to generate the serialized data in response to the first clock signal, where the deserializer circuit is configured to receive the serial receiver data in response to the second clock signal, and where the first and second clock signals have a phase difference controlled at least in part by a delay of a delay circuit. The system the transceiver circuit further including a first resettable clock circuit configured to generate a first clock signal, and a second resettable clock circuit configured to generate a second clock signal, where the first and second resettable clock circuits are configured to be reset with a scan enable signal, where the serializer circuit is configured to generate the serialized data in response to the first clock signal, where the deserializer circuit is configured to receive the serial receiver data in response to the second clock signal, and where the first register circuit is configured to receive the serial stimulus data in response to the scan enable signal.

Another general aspect is a method of testing a transceiver circuit, the method including with a controller, asserting a first scan enable signal, the first scan enable signal causing first and second resettable clock circuits of the transceiver circuit to be reset to a predetermined state, with the controller, providing serial stimulus data to a first register circuit of the transceiver circuit while the first scan enable signal is asserted, with the controller, causing the transceiver circuit to operate in a loopback mode to generate serial response data, with the controller, asserting a second scan enable signal, the second scan enable signal causing the first and second resettable clock circuits of the transceiver circuit to be reset to a predetermined state, with the controller, receiving the serial response data from a second register circuit while the second scan enable signal is asserted, and with the controller, processing the serial response data to test functionality of the transceiver circuit.

Implementations may include one or more of the following features. The method, where causing the transceiver circuit to operate in the loopback mode to generate the serial response data includes generating multi-bit parallel stimulus data with the first register circuit, generating serialized data with a serializer circuit of the transceiver circuit based at least in part on the multi-bit parallel stimulus data, where the serialized data is generated according to a first clock signal generated by the first resettable clock circuit, where the serializer circuit includes a serializer data storage device configured to receive and store each of a sequence of serializer bits of the multi-bit parallel stimulus data, and where the serializer data storage device lacks circuit structures for scanability, generating multi-bit parallel response data with a deserializer circuit of the transceiver circuit based at least in part on the serialized data, where the multi-bit parallel response data is generated according to a second clock signal generated by the second resettable clock circuit, where the deserializer circuit includes a deserializer data storage device configured to receive and store each of a plurality of deserializer bits of the multi-bit parallel response data, and where the deserializer data storage device lacks circuit structures for scanability, and generating the serial response data based at least in part on the multi-bit parallel response data with the second register circuit, the second register circuit including a plurality of second data storage devices connected in a second scan chain configuration, the second register circuit configured to receive the multi-bit parallel response data and to generate the serial response data. The method, further including generating the first and second clock signals based at least in part on a single third clock signal. The method, further including, with a delay circuit, controlling, at least in part, a phase difference of the first and second clock signals.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. A transceiver circuit, comprising:
a first register circuit, configured to receive serial stimulus data and to generate multi-bit parallel stimulus data;
a serializer circuit configured to receive the multi-bit parallel stimulus data and to generate serialized data based on the multi-bit parallel stimulus data, wherein the serializer circuit comprises a serializer data storage device, and wherein the serializer data storage device lacks circuit structures for scanability;
a deserializer circuit configured to receive serial receiver data corresponding with the serialized data and to generate multi-bit parallel response data based on the serial receiver data, wherein the deserializer circuit comprises a deserializer data storage device, and wherein the deserializer data storage device lacks circuit structures for scanability; and
a second register circuit, configured to receive the multi-bit parallel response data and to generate serial response data.

2. The transceiver circuit of claim 1, wherein the serialized data forms a first sequence of bit values, wherein the serial receiver data received by the deserializer circuit forms a second sequence of bit values, and wherein the first sequence of bit values is equal to the second sequence of bit values.

3. The transceiver circuit of claim 1, wherein the serial receiver data received by the deserializer circuit is generated based at least in part on an analog signal, and wherein the analog signal is generated based at least in part on the serialized data.

4. The transceiver circuit of claim 1, wherein the first register circuit is configured to receive a test pattern, and to recirculate the test pattern according to a test standard.

5. The transceiver circuit of claim 1, wherein the deserializer circuit is configured to receive the serial receiver data in response to a first clock signal having a first frequency, wherein the deserializer circuit is configured to generate the multi-bit parallel response data in response to a second clock signal having a second frequency, wherein the second frequency is less than the first frequency.

6. The transceiver circuit of claim 1, wherein the serializer circuit is configured to generate the serialized data in response to a first clock signal, wherein the deserializer circuit is configured to receive the serial receiver data in response to a second clock signal, and wherein the first and second clock signals are both derived from a single third clock signal.

7. The transceiver circuit of claim 6, wherein the serializer circuit is configured to generate the serialized data in response to the first clock signal, wherein the deserializer circuit is configured to receive the serial receiver data in response to the second clock signal, and wherein the first and second clock signals have a phase difference controlled at least in part by a delay of a delay circuit.

8. The transceiver circuit of claim 1, further comprising:
a first resettable clock circuit configured to generate a first clock signal; and
a second resettable clock circuit configured to generate a second clock signal,
wherein the first and second resettable clock circuits are configured to be reset with a scan enable signal,
wherein the serializer circuit is configured to generate the serialized data in response to the first clock signal,
wherein the deserializer circuit is configured to receive the serial receiver data in response to the second clock signal, and
wherein the first register circuit is configured to receive the serial stimulus data in response to the scan enable signal.

9. A system, comprising:
a controller; and
a transceiver circuit, comprising:
a first register circuit, configured to receive serial stimulus data and to generate multi-bit parallel stimulus data;
a serializer circuit configured to receive the multi-bit parallel stimulus data and to generate serialized data based on the multi-bit parallel stimulus data, wherein the serializer circuit comprises a serializer data storage device, and wherein the serializer data storage device lacks circuit structures for scanability;
a deserializer circuit configured to receive serial receiver data corresponding with the serialized data and to generate multi-bit parallel response data based on the serial receiver data, wherein the deserializer circuit comprises a deserializer data storage device, and wherein the deserializer data storage device lacks circuit structures for scanability; and
a second register circuit, configured to receive the multi-bit parallel response data and to generate serial response data,
wherein the controller is configured to provide the serial stimulus data to the first register circuit with a first scan operation, and wherein the controller is configured to receive the serial response data from the second register circuit in a second scan operation.

10. The system of claim 9, wherein the serialized data forms a first sequence of bit values, wherein the serial receiver data received by the deserializer circuit forms a second sequence of bit values, and wherein the first sequence of bit values is equal to the second sequence of bit values.

11. The system of claim 9, wherein the serial receiver data received by the deserializer circuit is generated based at least in part on an analog signal, and wherein the analog signal is generated based at least in part on the serialized data.

12. The system of claim 9, wherein the first register circuit is configured to receive a test pattern, and to recirculate the test pattern according to a test standard.

13. The system of claim 9, wherein the deserializer circuit is configured to receive the serial receiver data in response to a first clock signal having a first frequency, wherein the deserializer circuit is configured to generate the multi-bit parallel response data in response to a second clock signal having a second frequency, wherein the second frequency is less than the first frequency.

14. The system of claim 9, wherein the serializer circuit is configured to generate the serialized data in response to a first clock signal, wherein the deserializer circuit is configured to receive the serial receiver data in response to a second clock signal, and wherein the first and second clock signals are both derived from a single third clock signal.

15. The system of claim 14, wherein the serializer circuit is configured to generate the serialized data in response to the first clock signal, wherein the deserializer circuit is configured to receive the serial receiver data in response to the second clock signal, and wherein the first and second clock signals have a phase difference controlled at least in part by a delay of a delay circuit.

16. The system of claim 9, the transceiver circuit further comprising:
a first resettable clock circuit configured to generate a first clock signal; and
a second resettable clock circuit configured to generate a second clock signal,
wherein the first and second resettable clock circuits are configured to be reset with a scan enable signal,
wherein the serializer circuit is configured to generate the serialized data in response to the first clock signal,
wherein the deserializer circuit is configured to receive the serial receiver data in response to the second clock signal, and
wherein the first register circuit is configured to receive the serial stimulus data in response to the scan enable signal.

17. A method of testing a transceiver circuit, the method comprising:
with a controller, asserting a first scan enable signal, the first scan enable signal causing first and second resettable clock circuits of the transceiver circuit to be reset to a predetermined state;
with the controller, providing serial stimulus data to a first register circuit of the transceiver circuit while the first scan enable signal is asserted;
with the controller, causing the transceiver circuit to operate in a loopback mode to generate serial response data;
with the controller, asserting a second scan enable signal, the second scan enable signal causing the first and second resettable clock circuits of the transceiver circuit to be reset to a predetermined state;
with the controller, receiving the serial response data from a second register circuit while the second scan enable signal is asserted; and
with the controller, processing the serial response data to test functionality of the transceiver circuit.

18. The method of claim 17, wherein causing the transceiver circuit to operate in the loopback mode to generate the serial response data comprises:
generating multi-bit parallel stimulus data with the first register circuit,
generating serialized data with a serializer circuit of the transceiver circuit based at least in part on the multi-bit parallel stimulus data, wherein the serialized data is generated according to a first clock signal generated by the first resettable clock circuit, wherein the serializer circuit comprises a serializer data storage device configured to receive and store each of a sequence of serializer bits of the multi-bit parallel stimulus data, and wherein the serializer data storage device lacks circuit structures for scanability;
generating multi-bit parallel response data with a deserializer circuit of the transceiver circuit based at least in part on the serialized data, wherein the multi-bit parallel response data is generated according to a second clock signal generated by the second resettable clock circuit, wherein the deserializer circuit comprises a deserializer data storage device configured to receive and store each of a plurality of deserializer bits of the multi-bit parallel response data, and wherein the deserializer data storage device lacks circuit structures for scanability; and
generating the serial response data based at least in part on the multi-bit parallel response data with the second register circuit, the second register circuit comprising a plurality of second data storage devices connected in a second scan chain configuration, the second register circuit configured to receive the multi-bit parallel response data and to generate the serial response data.

19. The method of claim 18, further comprising generating the first and second clock signals based at least in part on a single third clock signal.

20. The method of claim 18, further comprising, with a delay circuit, controlling, at least in part, a phase difference of the first and second clock signals.

* * * * *